United States Patent

[11] 3,624,300

[72] Inventors Lester Q. Krasin
Dallas;
Clifford E. Greene, Forth Worth, both of Tex.
[21] Appl. No. 887,287
[22] Filed Dec. 22, 1969
[45] Patented Nov. 30, 1971
[73] Assignee Superior Continental Corporation
Hickory, N.C.
Original application Aug. 2, 1967, Ser. No. 660,165, now Patent No. 3,510,584, which is a continuation-in-part of application Ser. No. 549,399, May 11, 1966, now abandoned. Divided and this application Dec. 22, 1969, Ser. No. 887,287

[54] CENTRAL OFFICE TERMINAL UNIT FOR TELEPHONE CARRIER SYSTEM
5 Claims, 12 Drawing Figs.

[52] U.S. Cl. .......... 179/2.5

[51] Int. Cl. .......... H04h 1/08
[50] Field of Search .......... 179/2.5, 26

[56] References Cited
UNITED STATES PATENTS

| | | | |
|---|---|---|---|
| 2,829,204 | 4/1958 | Dimond | 179/26 |
| 2,932,694 | 4/1960 | Hawks | 179/2.5 X |
| 3,491,207 | 1/1970 | Birck | 179/2.5 X |

*Primary Examiner*—Ralph D. Blakeslee
*Attorney*—Owen, Wickersham and Erickson

ABSTRACT: A central office terminal unit for a telephone communication system which is adapted for connection to central office power supply and to a cable transmission pair from the central office as part of a system that supplies an additional subscriber facility without affecting the original facility. The central office terminal has receiver and transmitter sections for deriving from and supplying to the transmission pair an amplitude-modulated carrier signal and utilizes a power regulation and control means for regulating the voltage from the central office power supply to a predetermined level and supplying it to said receiver and transmitter sections.

PATENTED NOV 30 1971

3,624,300

SHEET 1 OF 7

INVENTORS
LESTER Q. KRASIN
CLIFFORD E. GREENE

Owen, Wickersham & Erickson
ATTORNEYS

INVENTORS
LESTER Q. KRASIN
CLIFFORD E. GREENE

Owen, Wickersham & Erickson
ATTORNEYS

INVENTORS
LESTER Q. KRASIN
BY CLIFFORD E. GREENE

Owen, Wickersham & Erickson
ATTORNEYS

INVENTORS
LESTER Q. KRASIN
CLIFFORD E. GREENE

Owen, Wickersham & Erickson
ATTORNEYS

INVENTORS
LESTER Q. KRASIN
CLIFFORD E. GREENE
Owen, Wickersham & Erickson
ATTORNEYS

INVENTORS
LESTER Q. KRASIN
CLIFFORD E. GREENE

Owen, Wickersham & Erickson
ATTORNEYS

INVENTORS
LESTER Q. KRASIN
CLIFFORD E. GREENE

Owen, Wickersham & Erickson
ATTORNEYS

CENTRAL OFFICE TERMINAL UNIT FOR TELEPHONE CARRIER SYSTEM

This application is a division of application Ser. No. 660,165 filed Aug. 2, 1967, now U.S. Pat. No. 3,510,584 which was a continuation-in-part of application Ser. No. 549,399 which was filed on May 11, 1966, and now abandoned.

This invention relates to telephone communication systems, and more particularly to apparatus for use in combination with existing telephone systems which facilitates the addition of a second subscriber telephone circuit to each cable transmission pair normally providing a single one-party subscriber telephone circuit.

With the rapid growth in population, the problem arose in telephone communication systems of providing for subscriber circuit expansion in areas where the subscriber exchange plant was already congested without the necessity of adding cable reinforcement. In other words, the problem was that of furnishing a second listed telephone for a business or residence. This problem became especially critical in many so-called "dedicated plant" areas where only one cable pair was allotted per residence address in building development areas. A general object of the present invention is to provide a practical, efficient and economical solution to the aforesaid problem.

Another object of our invention is to provide a subscriber terminal for a system that is adaptable for use in combination with and readily applicable to existing telephone facilities and will supply a second subscriber circuit for a cable pair. Moreover, it is an object of the invention to provide such a system that can be installed and maintained easily by telephone company personnel with no special skills being required.

Another object of the present invention is to provide a central office terminal unit for supplying a second subscriber circuit for an existing cable pair in a conventional telephone system that requires no external adjustments when it is installed. The equipment of our invention may readily take the form of prepackaged units that can be easily installed at the subscriber station and at a central office terminal of the system. There is no common equipment associated with the system of our invention which is required for a plurality of out units. Thus, no economic penalty is involved in applications where only a small number of circuits are required. Consequently, the equipment can be installed on a circuit-per-circuit basis as required, on a readily determined fixed cost per circuit basis.

Another object of the present invention is to provide a central office terminal unit that can be used in combination with a subscriber terminal unit for a telephone system that will supply a second subscriber circuit to an existing cable transmission pair and that utilizes its own battery power for operation. The subscriber terminal is continually recharged whenever the subscriber telephone of the physical circuit is in the "on-hook" position. Thus, for our added main line system, no external power source is required for either end of the equipment. The equipment is powered directly from the "talking battery" means normally supplied by the central office switching equipment to each subscriber circuit and is done in such a way that it does not interfere with the normal utilization of this power for operating the switching relays and providing telephone set transmitter current.

A more specific object of the present invention is to provide a central office terminal unit for an added main line telephone system having a power regulation and control means that functions to: (1) power a standby circuit of the receiver section of the central office terminal unit during the "on-hook" condition; (2) turn on the transmitter section when a carrier frequency signal is received from the subscriber terminal unit; and (3) turn on the transmitter section when ringing voltage is applied to the drop of the carrier derived circuit and the subscriber terminal unit is "on-hook."

Yet another object of the present invention is to provide a central office terminal unit with a power regulation and control means that provides the aforesaid functions with circuitry that operates solely on power derived from the central office "talking battery" power supply.

The unique method of the present invention of powering the added subscriber circuit also greatly enhances the simplicity of the equipment. The only connections required for a central office terminal unit are to the existing line terminals of the central office equipment and to the transmission cable pair. Our invention creates a completely static carrier channel; one which requires only the connection of the affected circuits to make it fully operable.

Another object of the present invention is to provide a central office terminal unit with a power regulation and control circuitry utilizing zener diodes arranged in either a parallel or series configuration.

Other objects, advantages and features of the present invention will become apparent from the following detailed description, one embodiment of which is presented in conjunction with the drawings, in which.

Figure 8:
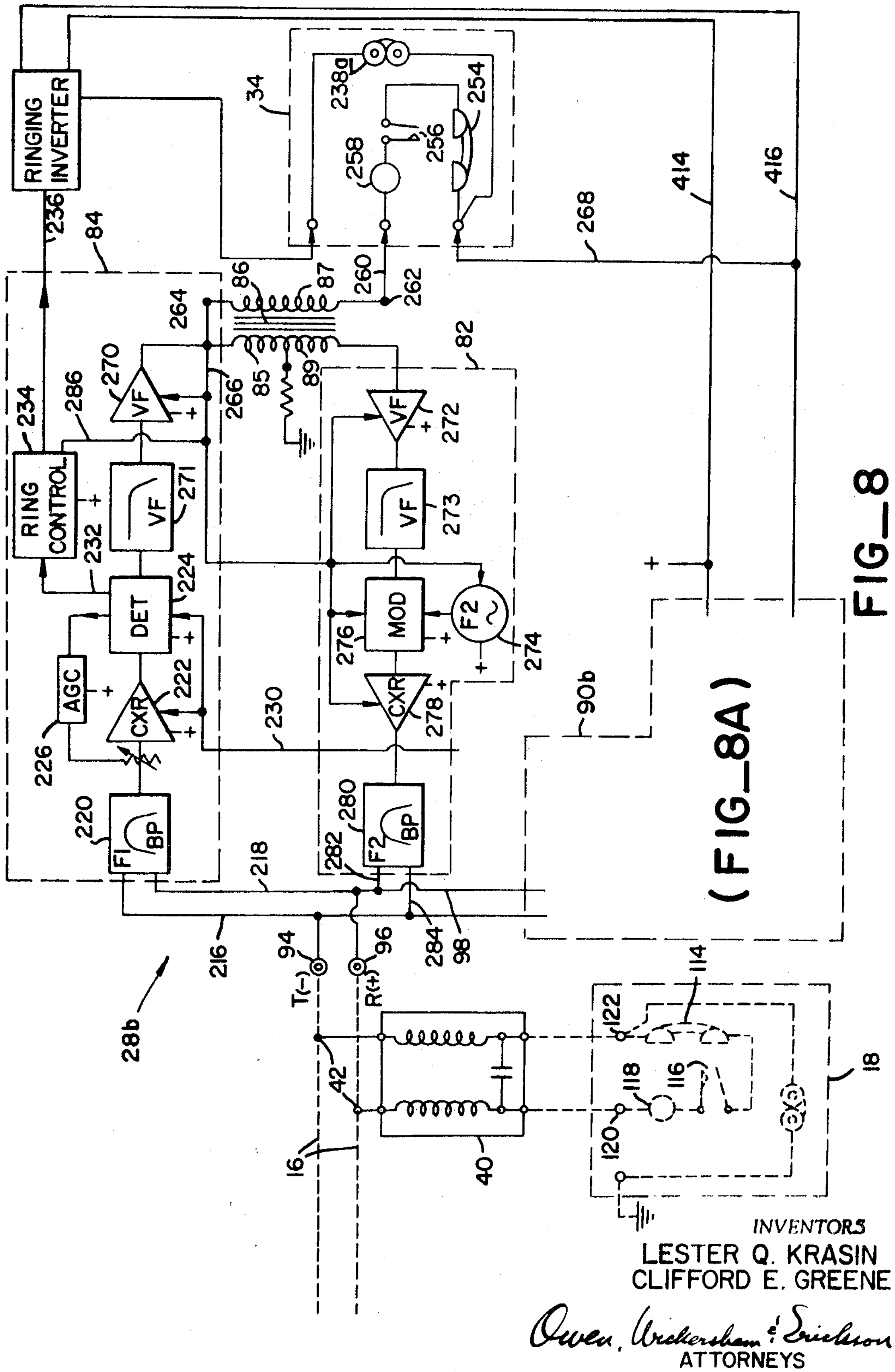
FIG. 8 is a combined block and circuit diagram showing still another embodiment of a subscriber station according to our invention with a further modified form of battery-charging circuit.
Figures 8A, 10:
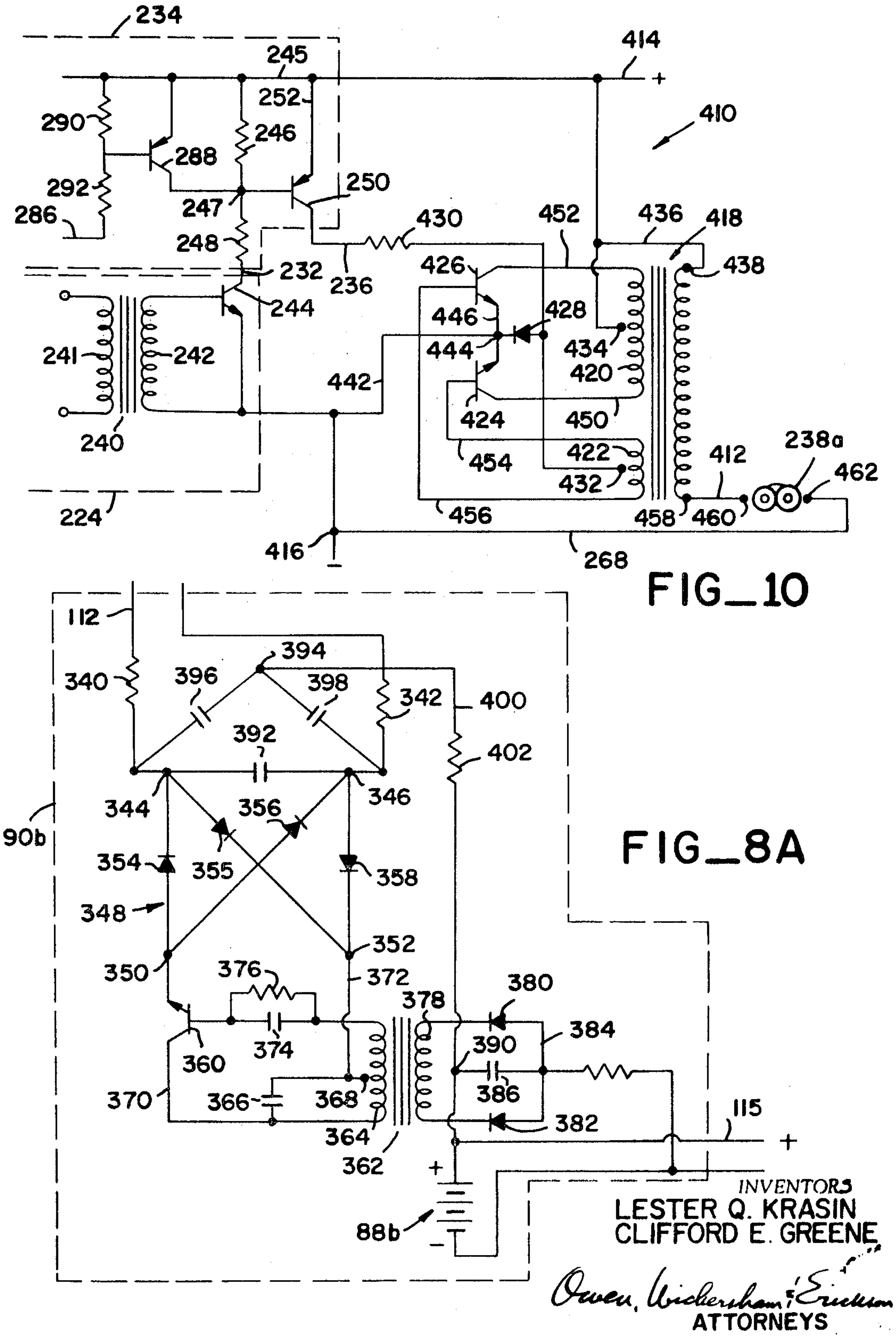
Figure 9:
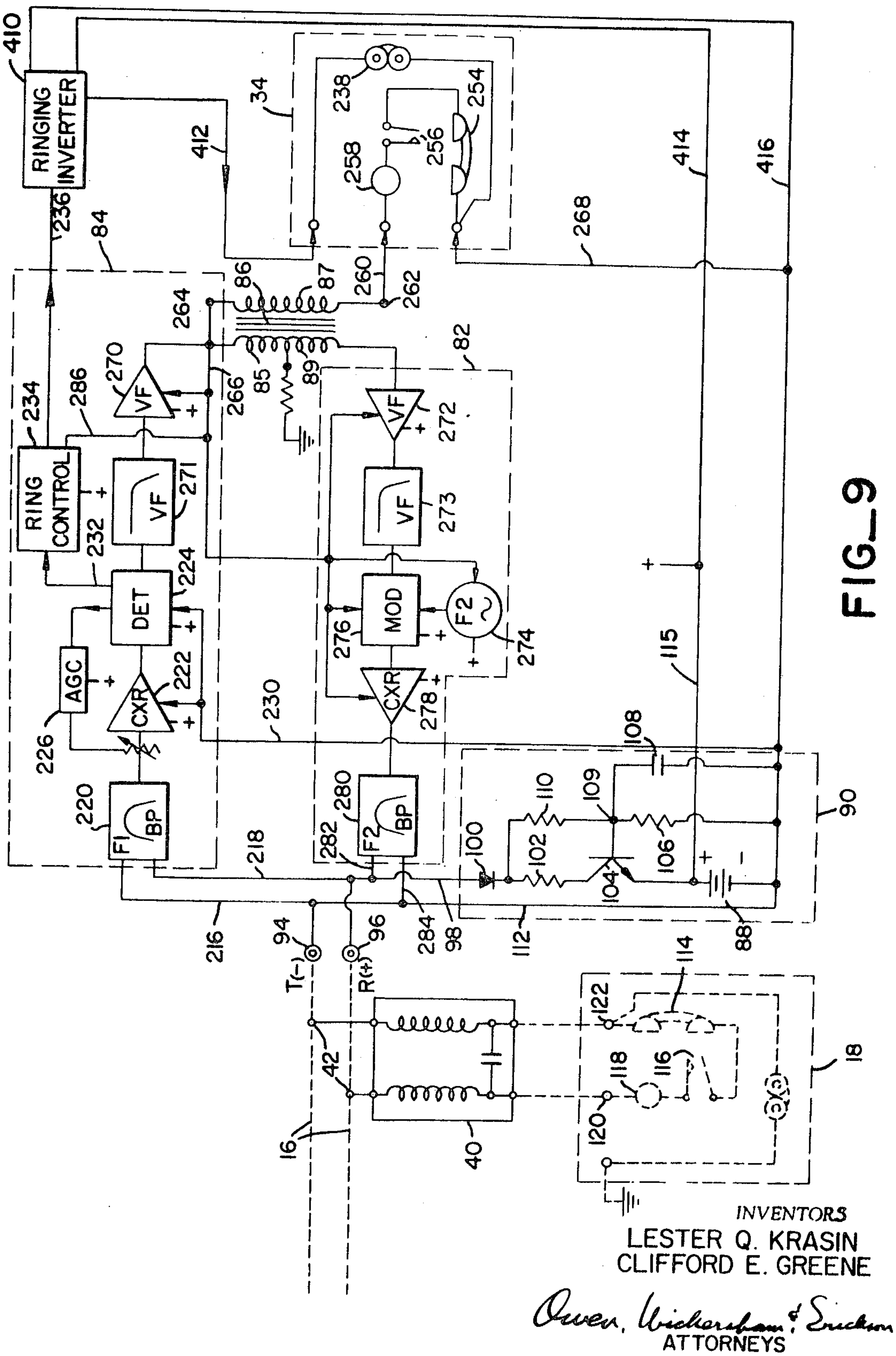

FIG 8*I* is a circuit diagram of the a component shown in FIG. 8;

FIG. 9 is a combined block and circuit diagram showing a modified subscriber station for the system utilizing a ringing inverter; and FIG. 10 is a detailed diagram of the ringing control circuit for the subscriber terminal unit shown in FIG. 9.

Figures 1, 2:
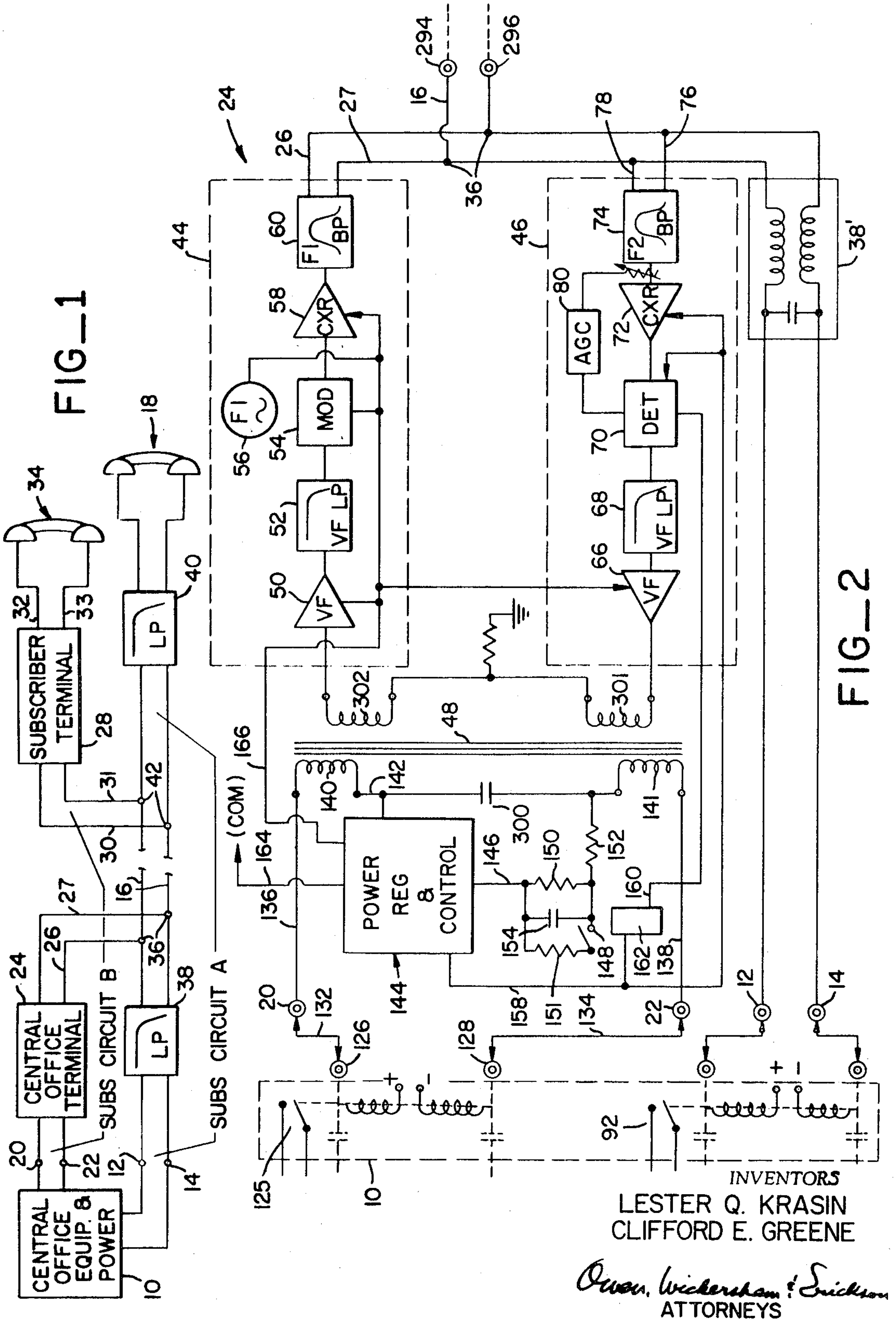
FIG. 1 is a block diagram showing the broad concept of a system embodying the principles of the present invention.
FIG. 2 is a combined block and circuit diagram showing the central office station for the system of FIG. 1.

In the drawing, FIG. 1 shows diagrammatically the arrangement according to the present invention, wherein a carrier-derived circuit is connected to a single physical subscriber circuit of a conventional telephone system, thereby enabling a second single party subscriber to be added to the one normally provided by the single transmission cable pair. Thus, at a residence or business office which is connected by only a cable pair to the telephone central office, an additional one-party subscriber can be added without increasing the transmission cable facilities. As shown, the conventional telephone exchange central office equipment, including its switching and line-finding circuits, is represented by the block 10. Its connector terminals 12 and 14 for the conventional subscriber's circuit, which shall be referred to as circuit A, are connected to a standard cable pair 16 that extend to the subscriber's station and are connected to a conventional telephone set 18. Another pair of connector terminals 20 and 22 from the central office equipment are connected to a central office terminal unit 24 of the carrier-derived circuit, hereinafter referred to as circuit B. On the other side of the central office terminal unit, a pair of leads 26 and 27 are connected to the cable pair 16.

At the subscriber station, a subscriber terminal unit 28 is connected on one side by a pair of leads 30 and 31 to the cable pair 16, and by another pair of leads 32 and 33 on the other side to the added subscriber's telephone set 34.

The carrier Circuit B, including the central office terminal unit 24 and the subscriber terminal unit 28, provide means for deriving and applying to the transmission pair a double sideband amplitude-modulated voice frequency signal. The system utilizes different frequencies for the two directions of the transmission. In the following description $F_1$ designates the frequency of the signal transmitted from the central office, while $F_2$ designates the frequency of the signal transmitted from the subscriber terminal unit 28.

At the telephone central office between the equipment terminals 12 and 14 and the junctions 36 of the central office terminal leads 26 and 27 and the cable pair 16, the latter passes through a first voice frequency (VF) low-pass filter 38. Similarly, at the subscriber station a second voice frequency low pass filter 40 is connected to the cable pair between the conventional telephone set 18 and the junctions 42 of the cable pair 16 and the leads 30 and 31 to the subscriber terminal unit 28. These filters 38 and 40 provide a means for isolating the physically derived circuit (circuit A) from the carrier circuitry associated with the carrier derived circuit (circuit B). Thus, since the added carrier circuit operates at the relatively low carrier frequencies $F_1$ and $F_2$, its transmissions are filtered out of the cable pair 16 and are thereby prevented from reaching the conventional telephone-receiving equipment at either the central office or the subscriber station.

As shown in FIg. 2 the central office terminal unit 24 comprises transmitter and receiver sections 44 and 46, respectively, both of which are connected to a hybrid transformer 48. The transmitter section includes a VF amplifier 50 connected in series to a VF lowpass filter 52, a modulator 54 connected to an oscillator 56 operating at the frequency $F_1$, a carrier amplifier 58 and band-pass filter 60, the latter having output leads 26 and 27 connected to the cable transmission pair 16. The receiver section 46 of the central office terminal includes a VF amplifier 66 connected in series to a VF low-pass filter 68, a detector 70, a carrier amplifier 72 and a band-pass filter 74 set for the frequency $F_2$ and having a pair of input leads 76 and 78 connected to the leads 26 and 27 and thus to the cable transmission pair. An automatic gain control means 80 is utilized in the central office terminal unit to maintain a substantially constant VF output with a wide range of signal power input levels, thereby eliminating the need for external field adjustments.

In an actual installation of our system the central office terminal unit 24 is preferably packaged as a small compact electronic component using conventional assembly techniques. Thus, it may be easily attached to the standard iron frame used for conventional telephone equipment, with the terminals for the connections, as described, being readily accessible.

The subscriber terminal unit 28, as shown in detail in FIG. 5, generally is similar to the central office terminal unit 24 in that it has transmitter and receiver sections 82 and 84 and equivalent components for filtering, amplifying, detecting and controlling signals, as described below. The transmitter and receiver sections are connected to the cable transmission pair 16 and, through a hybrid transformer 86, to the added subscriber telephone set 34. In accordance with the principles of the invention, the subscriber terminal unit 28 is powered by a self-contained battery 88 which is changed by DC voltage originating from the central office station and existent on the transmission cable pair 16. This battery, which may be any suitable form of rechargeable cell, such as the nickel-cadmium type, is constantly charged during the time that the conventional or physical circuit A is idle. Every time circuit A becomes active, the battery 88 is disconnected by means of a battery control circuit 90 in the subscriber terminal unit 28, the operation of which will become apparent as the detailed description of the apparatus proceeds.

With the battery 88, no external power source is required for either end of the equipment, and this is an important feature of our invention. Both the central office terminal unit 24 and the subscriber terminal unit 28 are powered by the "talking battery" power source which is normally supplied by the central office switching equipment 10. Moreover, this power, which is present in all conventional telephone systems, is supplied to each subscriber circuit in such a way that no interference occurs with its normal utilization for operating the switching relays and for providing normal telephone set transmitter current. In some instances, the central office terminal unit may be supplied with voltage directly from the central office source without involving the associated line equipment, but this in no way changes the operation of our invention.

The aforesaid and other features of the invention will now be described in greater detail by reviewing the various modes of operation of a typical system incorporating the invention. In an "idle circuit" condition direct current power (e.g., 50 volts) of the polarity indicated is continuously applied from the normal "talking battery" power source to the physical circuit A through the windings of a line relay 92 (FIG. 2), which is connected to the conventional line-selecting equipment (block 10). This voltage is thus present on the transmission pair 16 and is applied to the subscriber terminal unit 28 through a pair of terminals 94 and 96 and to its battery charging control circuit 90. Here, the positive voltage is applied through a lead 98, a diode 100, and a current limiting resistor 102 to the collector of a NPN-transistor 104, which is biased to a conducting condition by a bias net consisting of a resistor 106, a capacitor 108 and a resistor 110. When the transistor 104 conducts, a positive voltage is applied to the battery 88, which is connected through the return circuit through a lead 112 to the terminal 94. Thus, a charging current is provided to the battery 88 which is limited (e.g., to approximately 5ma.) by the resistor 102.

Figure 5:
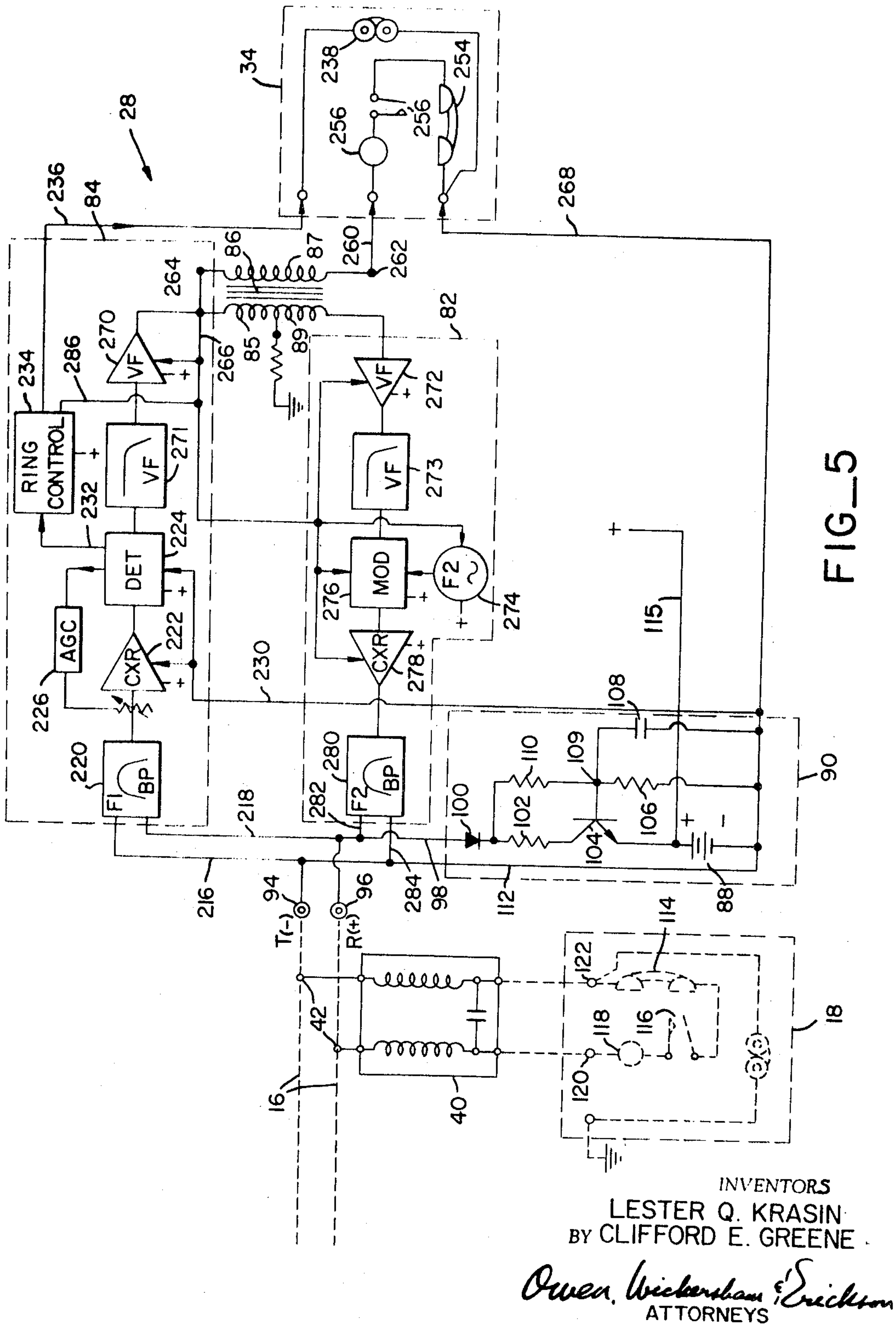
FIG. 5 is a combined block and circuit diagram showing the subscriber station for the system of FIG. 1.

The battery 88 is connected on its positive voltage side to a lead 115 which connects to all of the various components of the subscriber terminal unit 28, as shown in FIG. 5. To conserve space and avoid confusion, these connections from each component to the lead 266 are indicated by a lead from each component terminating with a "plus" sign.

Through the charging current is not sufficient to operate the line relay 92 at the central office, it would introduce a significant bias to any dial pulse originating from the normally connected subscriber telephone set 18 and, therefore, must be eliminated. In telephone set 18 the removal of the handset 114 from the switch hook cradle closes switch hook contacts 116, which through normally closed contacts in the dial 118 applies a resistance circuit between a pair of terminals 120 and 122. This resistance circuit appearing across the cable pair 16 serves to operate the relay 92, thereby seizing the central office switching equipment and at the same time substantially lowering the voltage appearing across the pair 16. This voltage across the terminals 94 and 96 results in a downward shift of the bias voltage of the transistor 104 being applied to its base from the junction of resistors 106 and 110, thereby causing the transistor 104 to become nonconducting and effectively disconnecting the battery 88 from the line. Thus, removal of the handset 114 from its hook cradle in the telephone set 18 interrupts the charging of the battery.

Figure 7:
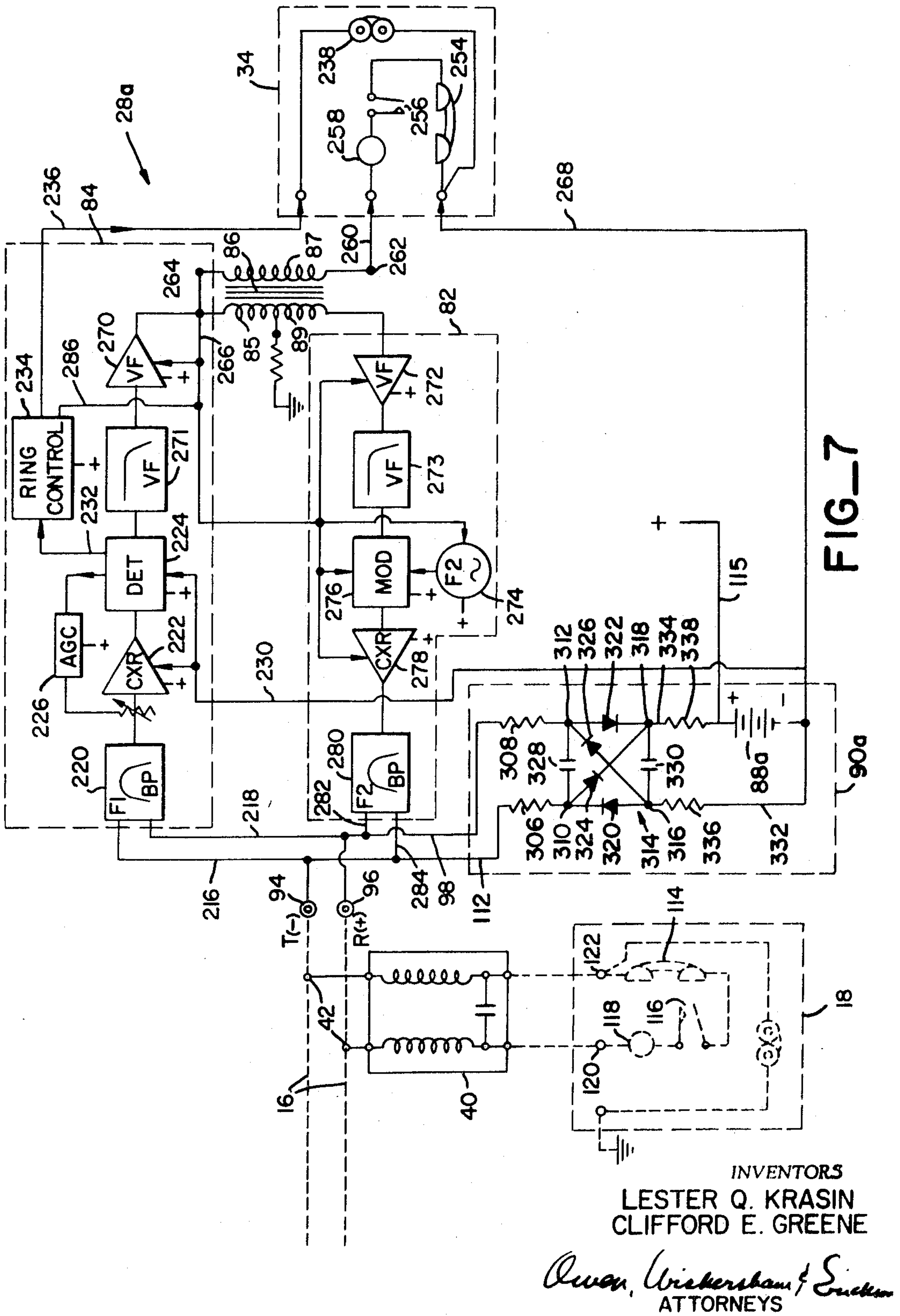
FIG. 7 is a combined block and circuit diagram showing another form of subscriber station according to the present invention with a modified battery-charging circuit.

In FIG. 7 a subscriber terminal unit **28*a* with an alternate form of battery control circuit 90*a* is shown which may be connected to the pair of input leads 98 and 112 without regard to the battery polarity. In the previously described control circuit 90, it is possible to connect the battery improperly and cause it to discharge eventually. In this alternate arrangement which eliminates the problem, the leads 98 and 112 are provided with current limiting and isolation resistors 306 and 308, respectively, and are connected to the input terminals 310 and 312 of a diode bridge circuit 314 which provides complete independence of polarity. In other words, whether a positive or negative voltage appears on an input lead, or an AC voltage, the DC output of the bridge circuit at its output terminals 316 and 318 will always be the same. The bridge circuit 314 may be of the conventional type and comprises four diodes 320, 322, 324 and 326 which are connected, as shown, between its input and output leads. A capacitor 328** is connected across the input leads to serve as an RF bypass, and another capacitor 330 is connected across the output leads to provide filtering. A pair of leads 332 and 334 containing resistors 336 and 338, respectively, are connected between the bridge output terminals and the terminals of the battery 88*a*. So long as the voltage apparent across the line terminals 94 and 96 is less than the voltage of the battery, plus the diode drops of the bridge circuit (e.g., nominal 7.2 volts), the diode bridge will no longer conduct. Therefore, the bridge circuit acting as a switch disconnects the charging circuit from the physical line. Thus, again the removal of the handset 114 from its hook cradle in the telephone set 18 interrupts the charging of the battery.

For some central office line circuits it is necessary to minimize the charging current derived from the physical circuit, so that sufficient line current is always available for operation of the standard equipment. This problem is overcome in another modified subscriber station 28*b*, shown in FIGS. 8 and 8*a*. Here, the leads 98 and 112 to the battery-charging control circuit 90*b* from the terminals 94 and 96 are connected through a pair of resistors 340 and 342 to the input terminals 344 and 346 of a diode bridge circuit 348. The latter has a pair of output terminals 350 and 352 and connected between the input and output terminals are four diodes 354, 355, 356 and 358. Connected to the output terminals of the bridge circuit is a high frequency (e.g., 140 kHz.) oscillator circuit which is comprised of a transistor 360, a transformer 362 and other associated components. The transistor 360 and the primary winding 364 of the transformer 362 are connected in a modified Hartley oscillator configuration. This includes a capacitor 366 connected from a center tap 368 across one portion of the primary winding, whose inductance with the capacitor forms a resonant circuit which is connected to the collector of the transistor 360 by a lead 370. The transistor emitter is connected to one output terminal 350 of the bridge circuit and a lead 372 connects the other output terminal 352 to the center tap 368 on the primary winding 364.

The other section of the primary winding 364 provides a positive feedback to the base of the transistor 360 through a bias network comprised of a capacitor 374 and a resistor 376 in parallel therewith. So long as a negative voltage is applied to the emitter of the transistor and a positive voltage to the tap 368 of the primary winding 364, this circuit will operate at its resonant frequency. The secondary winding 378 of the transformer 362 is inductively coupled and connected as a standard full wave rectifier circuit through a pair of diodes 380 and 382 provided in a lead 384 which interconnects its end terminals. A capacitor 386 is connected in a lead 388 between a center tap 390 of the secondary winding 378 and a junction with the lead 384 between the diodes 380 and 382. A capacitor 392 connected between the input terminals of the bridge circuit serves as an RF bypass. Between each of the input terminals 344 and 346 of the bridge circuit and a common terminal 394 are leads containing a pair of capacitors 396 and 398. A lead 400 connects this common terminal through a resistor 402 to the center tap 390 of the secondary winding which in turn is also connected by a lead 404 with the plus terminal of the battery 88*b*. These latter capacitors 396 and 398 serve to provide and preserve a balanced condition between the carrier line and the electronic circuitry.

Operation of the dial 118 on the conventionally connected subscriber telephone set 18 causes a succession of open-circuit pulses to appear across the transmission pair 16, and these in turn cause a pulsing operation of the relay 92 in the central office switching equipment 10. An open-circuit condition such as introduced by the opening of the dial 118 contacts will instantaneously cause the voltage to increase across the transmission pair 16, and through the terminals 94 and 96 to be applied, as previously described, to the battery 88 through the charging circuit. However, the time constant of the resistor 110 and the capacitor 108 are such that the bias voltage appearing at the junction 109 of resistor 110 and resistor 106 will not allow the base bias of transistor 104 to rise sufficient to cause conduction. Transistor 104, therefore, will remain in a nonconducting condition during dialing intervals.

An answered condition from the called party will cause a reversal of polarity of the voltage applied to the relay 92; thereby, reversing the polarity of the voltage appearing across transmission pair 16. This occurs because the calling party always gets reversed battery supervision. This reversed voltage, appearing at terminals 94 and 96 and acting at diode 100 effectively disconnects the battery-charging circuit 90 for the duration of the conversation through the reversed voltage condition appearing at the diode 100. Thus, seizure of the circuit A by normal answering procedure at the subscriber telephone set 18 disconnects the battery-charging circuit 90 of the subscriber terminal 28 and keeps it in a disconnected condition through the entire duration of the conversation. During this period, the subscriber terminal unit 28 will be operating directly off the stored energy in the battery 88.

The foregoing describes the normal call sequence of the physically derived circuit A, and we shall proceed to describe the carrier circuit B in greater detail.

The central office terminal unit 24 is completely powered by normal-talking battery current, which is supplied from the line relay circuit of the central office equipment 10 that controls a line relay 125 to a pair of line terminals 126 and 128. In the "idle circuit" condition, voltage of the polarity shown in FIG. 2 which is applied to these latter terminals, is supplied through leads 132 and 134 to the terminals 20 and 22 of the central office terminal unit. This voltage through the lead 136 and a winding 140 of the hybrid transformer 48 is applied through a lead 142 to a power regulation and control circuit 144, and it returns through lead 146 and a network consisting of a dialing relay contact 148, a pair of current-limiting resistors 150 and 152 and a capacitor 154. An arc suppression resistor 151 is connected to the relay contact 148 in parallel with the resistor 150.

Voltages derived from this circuit just described are used to: (1) Power the standby circuit of the receiver section 46 of the central office terminal unit 24 during the "on-hook" condition; (2) Turn on the transmitter section 44 when a carrier frequency signal is received from the subscriber terminal unit 28; and (3) Turn on the transmitter section 44 when ringing voltage is applied to the drop of the carrier-derived circuit B and the subscriber terminal unit 28 is "on-hook."

The aforesaid functions are accomplished through a series of output leads that extend from the power regulation and control unit 144. A first such lead 158 extends to the detector 70 and the carrier amplifier 72 of the receiver unit 46 and also by a branch lead 160 through a relay coil 162 to the detector, providing standby current to the receiver. A second output lead 164 is the common return lead for all electronic circuits. A third output lead 166 provides controlled DC power to the VF-amplifiers 50 and 66 of both the receiver and transmitter sections and to the modulator 54 and the oscillator 56 of the latter.

The power regulation and control circuit 144 may be arranged for either series or parallel mode operation. In the series mode, shown in detail in FIG. 3, this control circuit includes a bridge rectifier 168 having four terminals 170, 172, 174 and 176. The input lead 142 is connected to the terminal 170 and the opposite terminal 172 is connected to the lead 146 of the dialing relay network. The terminal 174 is connected to the first and second output leads 158 and 164 by a lead 180 at junctions 181 and 182, respectively, and the opposite terminal 176 is connected directly to the third output lead 166.

In the "idle circuit" condition, the voltage through the input lead 142 to the bridge rectifier 168 causes a DC voltage to appear across a capacitor 178 in a conductor connected between the opposite terminals 174 and 176. From the terminal 174 the lead 180 extends to a junction 182 with lead 164 which is at a common potential level. Between the lead 180 and the output lead 166 is a lead 184 in which two zener diodes 186 and 188 are connected in series. In an extension of the lead 180 connected to the common junction 182 and in parallel with the first zener diode 186 is a capacitor 190. A lead 192 interconnects the lead 180 at the common junction 182 to a junction 193 between the two zener diodes.

The DC voltage appearing across the capacitor 178 in the "idle circuit" condition causes a voltage to appear across the first zener diode 186 and the capacitor 190. This voltage thus is also present in the first output lead 158 and maintains the carrier amplifier 72, the detector 70 and the automatic gain control circuit 80 in an active circuit condition. The rest of the electronic circuitry of the central office terminal 24 being supplied with power through the lead 166 from the opposite terminal 176 is of such a magnitude as not to allow the second zener diode 188 to reach its zener voltage. This is due to the current limiting action of the resistors 150 and 152. It is seen, therefore, that in the "idle condition" the receiver of the central office terminal 24 is at all times in a condition to receive a transmitted signal of frequency $F_2$.

The application of a ringing signal in the central office switching equipment 10 will cause an alternating voltage to be superimposed upon the DC voltage apparent at the tip and ring terminals 126 and 128. This alternating voltage acting through the hybrid terminal windings 140 and 141 as previously described, will be rectified by the bridge circuit 168. The return circuit is through the capacitor 154 which is of such a value as to effectively shunt the current-limiting resistor 150, thereby causing an increased voltage to appear across the rectifier capacitor 178. This latter voltage reaches a magnitude that causes the zener diode 188, which is shunted by the electronic load, to reach its clamping voltage. This increase in voltage in turn will activate through the output lead 166, the VF amplifier 50, the modulator 54, the oscillator 56, and the carrier frequency amplifier 58, thereby causing a signal at frequency $F_1$ to be transmitted through the band-pass filter 60 over the leads 26 and 27 to the terminals 36, placing the signal on the transmission pair 16.

Figures 3, 4, 6:
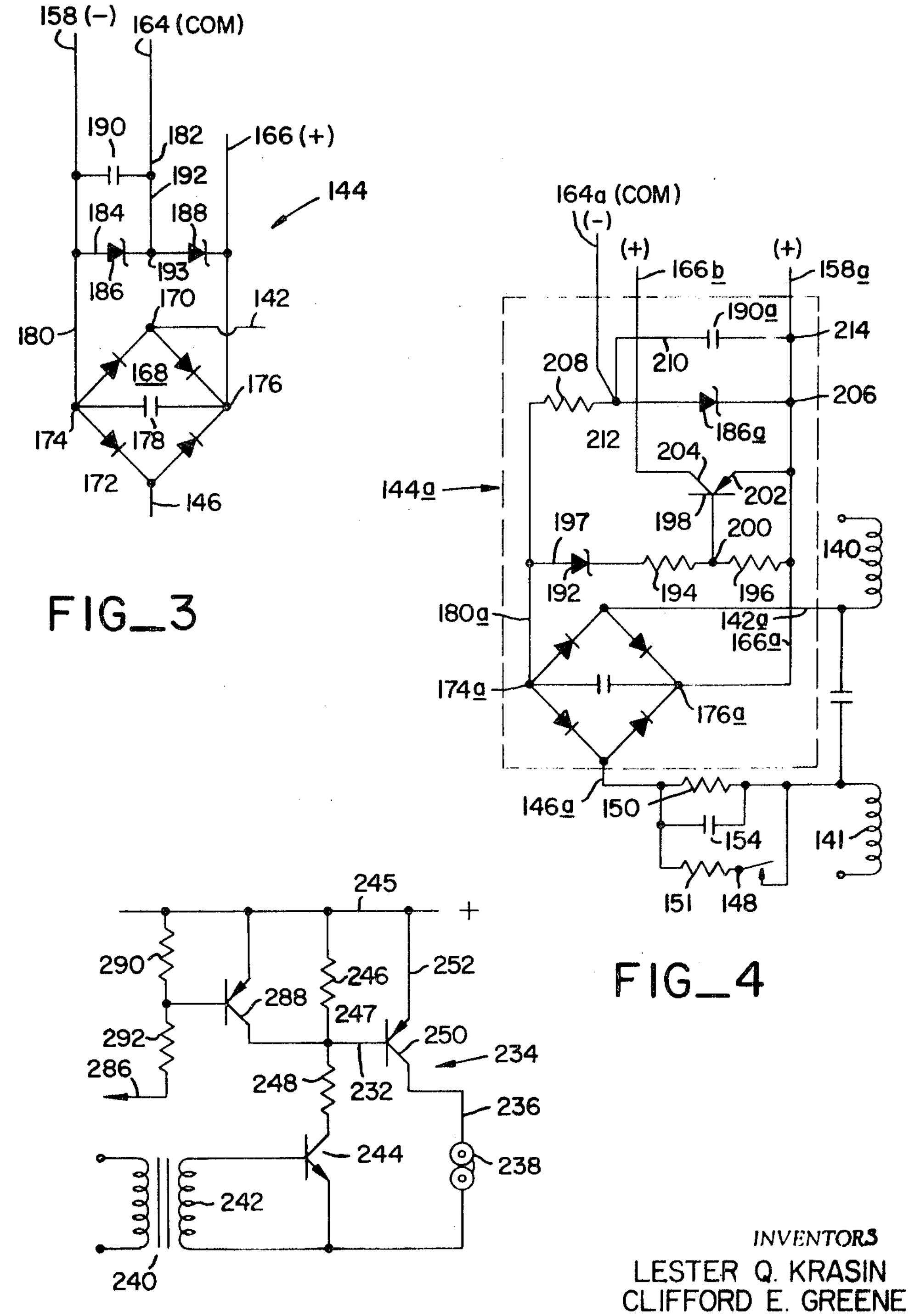
FIG. 3 is a detailed circuit diagram showing a series mode of a power-regulating system for the central office terminal unit of FIG. 2.
FIG. 4 is a detail circuit diagram showing an alternate parallel mode of a power-regulating system for the central office terminal of FIG. 2.
FIG. 6 is a detailed diagram of the ringing control circuit for the subscriber terminal unit shown in FIG. 5.

In the parallel operation mode for the power regulation and control circuit 144*a* shown in FIG. 4, the second zener diode 188 of the previous embodiment is replaced by a network which is connected in parallel with the first zener diode 186*a* and the capacitor 190*a*. The network here comprises another zener diode 192 and a pair of resistors 194 and 196 in series therewith in a lead 197 extending between a pair of leads 180*a* and 166*a* from the rectifier terminals 174*a* and 176*a*, respectively, the latter being at a positive voltage (e.g., 8 volts) and the former being at a common potential. A transistor 198 is base-connected to a junction 200 between the resistances 194 and 196, its emitter 202 being connected to the output lead 166*a*, and its collector 204 being connected to an output lead 166*b*. In the lead 180*a* which is connected to a junction 206 with the output lead 166*a* and in parallel with the lead 197 is a resistor 208 and the zener diode 186*a* in series. In parallel with the zener diode 186*a* is a lead 210 connected between junctions 212 and 214 containing the capacitor 190*a*. In the initial "idle" condition with the resistance 150 in the circuit there is not enough voltage difference developed between the output plus lead 166*a* and the common lead 180*a* to cause current to flow through the zener diode 192. When the relay contacts 148 are closed and the resistance 150 is shunted out, the potential difference between the leads 180*a* and 166*a* is sufficient to cause the zener diode 192 to draw current through the resistors 194 and 196. This establishes a turn-on bias between the base and the emitter of the transistor 198, thus applying voltage through the output lead 166*b* to the various components of the central office terminal.

The major difference between the foregoing series and parallel modes of operation for the power regulation and control circuit 144 is that in the series arrangement shown in FIG. 3, the voltage on the output lead 166 is positive with respect to common, and the voltage on the output lead 158 is negative with respect to common. In the parallel mode, the voltage on both of the output leads 166*b* and 158*a* is positive with respect to common. The parallel mode therefore has the advantage of being able to utilize components of the same polarity.

When a signal transmitted from the central office terminal 24 appears at the terminals 94 and 96 of the subscriber terminal unit 28, it travels through a pair of leads 216 and 218 and is selected by a band-pass filter 220 of its receiver section 84. A carrier-frequency amplifier 222 connected to the latter filter, a detector 224 and an automatic gain control circuit 226 of this receiver section 84 are normally activated by voltage from the battery 88 through a lead 230. These components, therefore, are in a condition to react to any signal selected by the band-pass filter 220. Upon reception, this incoming signal is amplified by the carrier frequency amplifier 222 and is detected by the detector 224. The AGC circuit 226 acts through its associated pad to maintain the output of the detector at a predetermined level. The detector through a lead 232 actuates a ringer control circuit 234, which through a lead 236, applies a DC voltage to the subscriber telephone set 34, actuating a DC ringer 238 which may be the conventional type.

In the ringing control circuit 234 shown in FIG. 6, the received signal from the central office terminal 24 at the frequency $F_1$ appears across the primary 241 of a transformer 240, which is part of the detector circuit 224. This signal is coupled to the secondary winding 242 which is connected between the emitter and base of a transistor 244. A voltage through the lead 266 from the battery 88 is applied through a pair of resistors 246 and 248 to the collector of the transistor 244. The voltage developed at the junction 247 between these resistors 246 and 248 is that voltage which is applied through the lead 232 to the ring control circuit 234. In its initial condition (without signal) the detector transistor 244 is in a nonconducting condition. Appearance of a signal from the secondary winding 242 to the base of transistor 244 through lead 232 causes this transistor to become conducting, thereby causing a voltage drop to appear across the resistors 246 and 248. This voltage drop in the polarity indicated is applied through the lead 232 to a ring control transistor 250, which was initially in a nonconducting stage, causing it to become conducting and to apply a positive DC voltage from the lead 266 through a lead 252 and the lead 236 to the DC ringer 238, thereby actuating it.

In some instances it may be desirable to employ standard straight line ringers in our system of the type which are operable by an alternating (e.g., 20 cycle) ringing voltage rather than by a DC voltage as utilized in the diagram shown in FIG. 6. In a block diagram of FIG. 9 an arrangement for accomplishing this modification is shown which includes a ringing inverter 410 connected to the output lead 236 of the ring control circuit 234 and having an output connected through a lead 412 to an input terminal of the telephone set 34. The inverter receives battery power through a pair of leads 414 and 416.

As illustrated in detail in FIG. 10, the inverter circuit 410 comprises a transformer 418 having first and second primary windings 420 and 422, a pair of transistors 424 and 426 and a diode 428. As previously described, a positive voltage is supplied to the ring control circuit 234 through the lead 252 and the lead 236. However, this lead 236 is now connected through a resistor 430 to a tap 432 on the second primary winding 422. A positive voltage is also supplied from the lead 245 to a tap 434 of the first primary winding 420 and by a lead 436 from the lead 245 to an end terminal 438 of the secondary winding 440.

A negative voltage supplied to the inverter circuit 410 through a lead 442 is connected to a junction 444 in a lead 446 connecting emitters of the transistors 424 and 426. The diode 428 is in a lead which extends from the junction 444 to the lead 236. From the end terminals of the first primary winding 420 a pair of leads 450 and 452 and connected to the collectors of the transistors 424 and 426, respectively, and from the ends of the second primary winding 422 a pair of leads 454 and 456 are connected to the transistor bases.

As stated, one end of the secondary winding 440 is connected to the positive voltage lead 436 at the end terminal 438. The other end 458 of the secondary winding is connected to one terminal 460 of a standard straight line ringer 238*a* whose other terminal 462 is connected by a lead 268 to the negative power lead 416.

The positive voltage through the resistor 430 applied to the diode 428 and the center tap 432 of the second primary winding 420 will, due to the potential drop across the diode, cause a turn-on bias to appear at the bases of the transistors 424 and 426, thereby causing a multivibrator action to commence, which may be described as follows.

Whichever transistor starts conduction first will draw increased current through its particular half of the winding. The windings are so fixed that such an increase in collector current of a specific transistor will cause an increased base voltage on the same transistor so that the current will continue to increase until such time as the magnetic core of the transformer 418 saturates. At this time current in the conducting transistor will remain constant until no longer able to apply an increased current; the current will start to decrease on the conducting transistor and at the same time apply a turn-on bias to the nonconducting transistor which will go through the same sequence. Therefore, with voltage applied and a turn-on bias present, the two transistors 424 and 426 will switch alternately from nonconduction to saturation at a rate determined by the magnetic time constant of transformer 418, in this case a nominal 20 Hz. The primary windings 420 and 422 of the transformer inductively coupled to the secondary winding 440 have a step-up ratio, so that the output voltage (e.g., approximately 100 volts) is applied through the terminal 460 to the standard straight line ringer 238*a*, such as is normally included in a standard telephone set.

Removing the handset 254 of telephone set 34 will cause closure of its switch hook contact 256 (FIG. 5), which closes a circuit through the normally closed contacts of a dial 258 of the set 34 and a lead 260 to a terminal 262 of the hybrid transformer 86. The voltage thus appearing at a terminal 264 and in a lead 266 will cause a negative voltage from a lead 268 to be applied through the set 34 to a VF amplifier 270 in the receiver 84, a VF amplifier 272 in the transmitter 82, and an oscillator 274, a modulator 276 and a carrier frequency amplifier 278 of the transmitter section 82, thereby applying a signal at the frequency $F_2$ to a band-pass filter 280. This signal through leads 282 and 284 and leads 112 and 98 will be applied to the terminals 94 and 96 connected to the transmission pair 16. Simultaneously the negative voltage from lead 266 is applied to a lead 286 of the ring control circuit 234.

As shown in FIG. 6, a transistor 288 of the ring control circuit is initially nonconducting, being biased "off" through a resistor 290. Application of negative voltage from the lead 286 through a resistor 292 to the base of the transistor 288 causes it to become conductive. This effectively shorts the bias resistor 246 causing the transistor 250 to become nonconductive, thereby deactivating the ringer 238 and keeping it inactive as long as the handset 254 remains "off-hook."

At the central office terminal unit 24, the signal transmitted from the subscriber terminal unit 28 at frequency $F_2$ when the handset 254 is "off-hook" appears through the transmission pair 16 at a pair of terminals 294 and 296 and is conducted through the leads 76 and 78 to the band-pass filter 74. It is then amplified by the carrier-frequency amplifier 72 and is detected by the detector 70 at a predetermined level established by the AGC circuit 80 and its associated pad. Detection of this signal acting through lead 160 will cause operation of the relay 162 causing closure of it contacts 148 which, acting through the windings 140 and 141 of the hybrid transformer 48, will present a resistant condition of such magnitude to appear across the terminals 20 and 22 that the ringing signal from the central office switching equipment 10 will be cut off. This then would leave both the subscriber terminal 28 and the central office terminal 24 in a fully active condition and in readiness to provide two-way voice frequency communications. This is by virtue of the fact that the circuit limiting resistor 150 has been shunted out by the much lower resistance of the arc suppression resistor 151.

Normally, there is not sufficient current applied to the carrier frequency amplifier 72 and the detector 70 to cause the relay 162 to be operative. However, the current stored in the capacitor 190 associated with these components will provide the initial pulse of current of sufficient magnitude to operate the relay 162, and closure of the contact 148 will maintain the current at an adequate level to keep this relay in an activated condition so long as a signal is maintained through the detector 70.

In the case of a call initiated from the subscriber end, the circuitry functions as follows: Removal of the handset 254 from its switch hook cradle, as shown in FIG. 5, will close the switch hook contacts 256, thereby applying negative voltage derived from the lead 268 through the lead 260 at the terminal 262 and the primary winding of the transformer 86 apparent at the terminal 264 through lead 266 to all the connected circuit elements. As previously described, this will place a signal at frequency $F_2$ through the terminals 94 and 96 to the transmission pair 16. Selection of this signal by the band-pass filter 74 of the central office terminal unit 24 will activate the detector 70 and cause operation of the relay 162 and closure of its associated contacts 148. This will apply full voltage to all elements of the central office terminal 24 at the same time causing a resistant circuit condition to appear across terminals 20 and 22. This resistant circuit condition through leads 132 and 134 will be applied to the line-switching equipment terminals 126 and 128, seizing the line relay 125 of the line-switching equipment and causing a dial tone to be applied to the terminals 126 and 128. This tone is transmitted back by the carrier frequency circuit B to the subscriber telephone set 34. After reception of the dial tone, the subscriber will commence dialing. Operation of the dial 258 will interrupt the DC voltage being applied to the various circuit elements from the lead 268 through the lead 266. This will cause the signal at frequency $F_2$ to be interrupted in a digital manner in accordance with the dial information. This dialed interruption of signal $F_2$ detected in the detector 70 of the central office terminal will cause an instep operation of the relay contacts 148, which in turn will cause a pulsing of the relay 125 in the associated line switching equipment 10. The answered condition of the called party will cause a reversal of polarity to appear at terminals 126 and 128 in the conventional manner. Due, however, to the bridge circuit characteristics of the rectifier circuit 168, this reversal of polarity will have no effect on the power utilized by the terminal equipment.

Under talking circuit conditions conversation appearing at the terminals 126 and 128 through the leads 132 and 134 and appearing at terminals 20 and 22 of the terminal equipment are impressed across the windings 140 and 141 of the hybrid transformer through a capacitor 300 in a lead interconnecting these windings. This conversation is coupled to a winding 302 of the hybrid transformer, is amplified by the VF amplifier 50 and impressed through the VF lowpass filter 52 on the modulator 54 where it effectively modulates the carrier signal $F_1$ developed from the oscillator 56. This modulated signal is then applied to the carrier frequency amplifier 58 through the band-pass filter 60, through leads 26 and 27 and to the terminals 36 on the transmission pair 16. This signal then appears at the terminals 94 and 96 at the subscriber terminal 28 and is connected through leads 216 and 218 to the band-pass filter 220. It is then amplified by the carrier-frequency amplifier 222, is detected by the detector 224, and the AGC circuit 226 acts to maintain the demodulated VF signal at a constant level. This signal is integrated in the lowpass VF filter 271 and is amplified by the VF amplifier 270 before being applied to the secondary winding 85 of the hybrid transformer 86.

The VF information appearing between the terminals 262 and 264 of the transformer primary 87 effectively modulates the DC current flowing through the telephone set 34 which in turn is heard through the handset 254 of the telephone. In the reverse direction, the handset of the subscriber telephone set 34 is effectively in series with a primary winding 87 of the hybrid transformer 86 and the electronic equipment powered through the lead 266. This information appearing across the terminals 262 and 264 is effectively being coupled from this primary winding 87 to the secondary winding 89 and to the VF amplifier 272 of the transmitter 82. From this point forward the sequence of events is identical to that described in the previous paragraph.

From the foregoing it should be apparent that the present invention provides an effective solution to the problem of furnishing additional subscriber facilities without increasing physical cable installations. As described, the system fully and efficiently performs all normal telephone functions and maintains sufficient operating power by the battery 88 which is charged by current from the normal central office source.

To those skilled in the art to which this invention relates, many changes in construction and widely differing embodiments and applications of the invention will suggest themselves without departing from the spirit and scope of the invention. The disclosures and the description herein are purely illustrative and are not intended to be any sense limiting.

We claim:

1. In a telephone system for providing service from a central office having a common power supply via carrier derived circuit to an additional telephone set at a subscriber station over a conductive transmission line interconnecting the central office and the subscriber station, a central office terminal unit at the central office for deriving from and applying to the transmission line an amplitude-modulated signal, said unit comprising:

a receiver section and a transmitter section with input leads adapted to be connected to the central office and output leads adapted to be connected to said transmission line, said transmitter section comprising:

a voice frequency amplifier connected in series to a lowpass filter, a modulator connected to an oscillator operating at a first predetermined frequency, a carrier amplifier and a band-pass filter having output leads connected to said transmission pair, said receiver section comprising a voice frequency amplifier connected in series to a voice frequency lowpass filter, a detector, a carrier amplifier and a band-pass filter set at a second predetermined frequency and having a pair of input leads connected to said transmission pair, and automatic gain control means in said receiver section for maintaining a constant voice frequency output.

and power regulation and control means for regulating the voltage from the common power supply to a predetermined level and supplying it to said receiver and transmitter sections, and including means for supplying standby power to said receiver section to provide an "idle circuit" condition when said additional telephone set is "on-hook," means for turning on the transmitter section in response to a carrier-frequency signal from the subscriber station; and means for turning on said transmitter section when ringing voltage is applied to the carrier-derived circuit and the additional telephone at the subscriber station is in the "on-hook" condition.

2. In a telephone system for providing service from a central office having a common power supply via a carrier-derived circuit to an additional telephone set at a subscriber station over a conductive transmission line interconnecting the central office and the subscriber station, a central office terminal unit at the central office for deriving from and applying to the transmission line an amplitude-modulated signal, said unit comprising:

a receiver section and a transmitter section with input leads adapted to be connected to the central office and output leads adapted to be connected to said transmission line, said transmitter section comprising:

a voice frequency amplifier connected in series to a lowpass filter, a modulator connected to an oscillator operating at a first predetermined frequency, a carrier amplifier and a band-pass filter having output leads connected to said transmission pair, said receiver section comprising a voice frequency amplifier connected in series to a voice frequency lowpass filter, a detector, a carrier amplifier and a band-pass filter set at a second predetermined frequency and having a pair of input leads connected to said transmission pair, and automatic gain control means in said receiver section for maintaining a constant voice frequency output, and power regulation and control means for regulating the voltage from the common power supply to a predetermined level and supplying it to said receiver and transmitter sections, and including a bridge rectifier, a network connected to said rectifier including first and second zener diodes in series, means in combination with said first zener diode for keeping said receiver section active in the "idle circuit" condition, and means in combination with said second zener diode for activating said transmitter section in response to a ringing signal in the central office.

3. In a telephone system for providing service from a central office having a common power supply via a carrier-derived circuit to an additional telephone set at a subscriber station over a conductive transmission line interconnecting the central office and the subscriber station, a central office terminal unit at the central office for deriving from and applying to the transmission line an amplitude-modulated signal, said unit comprising:

a receiver section and a transmitter section with input leads adapted to be connected to the central office and output leads adapted to be connected to said transmission line, said transmitter section comprising:

a voice frequency amplifier connected in series to a lowpass filter, a modulator connected to an oscillator operating at a first predetermined frequency, a carrier amplifier and a band-pass filter having output leads connected to said transmission pair, said receiver section comprising a voice frequency amplifier connected in series to a voice frequency lowpass filter, a detector, a carrier amplifier and a band-pass filter set at a second predetermined frequency and having a pair of input leads connected to said transmission pair, and automatic gain control means in said receiver section for maintaining a constant voice frequency output, and power regulation and control means for regulating the voltage from the common power supply to a predetermined level and supplying it to said receiver and transmitter sections, and including a bridge rectifier, a first zener diode connected thereto, a network in parallel with said first zener diode including a second zener diode in series with a pair of resistors, and a transistor base-connected between said resistors and providing an output connected to said transmitter section, whereby an increased potential applied to said second zener diode due to a ringing voltage from the central office causes said transistor to conduct and supply current to said transmitter section.

4. In a telephone system for providing service from a central office having a common power supply via a carrier-derived circuit to an additional telephone set at a subscriber station over a conductive transmission line interconnecting the central office and the subscriber station, a central office terminal unit at the central office for deriving from and applying to the transmission line an amplitude-modulated signal, said unit comprising:

a receiver section and a transmitter section with input leads adapted to be connected to the central office and output leads adapted to be connected to said transmission line, said transmitter section comprising:

a voice frequency amplifier connected in series to a lowpass filter, a modulator connected to an oscillator operating at a first predetermined frequency, a carrier amplifier and a band-pass filter having output leads connected to said transmission pair, said receiver section comprising a voice frequency amplifier connected in series to a voice frequency lowpass filter, a detector, a carrier amplifier and a band-pass filter set at a second predetermined frequency and having a pair of input leads connected to said transmission pair, and automatic gain control means in said receiver section for maintaining a constant voice frequency output, and power regulation and control means for regulating the voltage from the common power supply to a predetermined level and supplying it to said receiver and transmitter sections, and including a bridge rectifier, first and second zener diodes in a control network connected to an output from said rectifier and a capacitor connected in parallel to said first zener diode and to a rectifier output terminal, said second zener diode being prevented from reaching its zener voltage during the idle circuit condition but reaching its clamping voltage in response to a ringing signal to the central office terminal, thereby activating carrier transmitter components.

5. In a telephone system for providing service from a central office having a common power via a carrier-derived circuit to an additional telephone set at a subscriber station over a conductive transmission line interconnecting the central office and the subscriber station, a central office terminal unit at the central office for deriving from and applying to the transmission line an amplitude-modulated signal, said unit comprising:

a receiver section and a transmitter section with input leads adapted to be connected to the central office and output leads adapted to be connected to said transmission line, said transmitter section comprising:

a voice frequency amplifier connected in series to a lowpass filter, a modulator connected to an oscillator operating at a first predetermined frequency, a carrier amplifier and a band-pass filter having output leads connected to said transmission pair, said receiver section comprising a voice frequency amplifier connected in series to a voice frequency lowpass filter, a detector, a carrier amplifier and a band-pass filter set at a second predetermined frequency and having a pair of input leads connected to said transmission pair, and automatic gain control means in said receiver section for maintaining a constant voice frequency output, and power regulation and control means for regulating the voltage from the common power supply to a predetermined level and supplying it to said receiver and transmitter sections, and including a bridge rectifier, first and second zener diodes in a parallel arrangement, said first zener diode being in series with a pair of resistors, and a transistor switch being base-connected between said resistors with its collector providing a power output lead, and its emitter connected to a rectifier output terminal said first zener diode being operative to draw current through said resistors to establish a turn-on bias for said transistor when the carrier circuit is activated.

* * * * *

UNITED STATES PATENT OFFICE
CERTIFICATE OF CORRECTION

Patent No. 3,624,300 Dated November 30, 1971

Inventor(s) Lester Q. Krasin, et. al.

It is certified that error appears in the above-identified patent and that said Letters Patent are hereby corrected as shown below:

Column 1, line 14, "the", second occurrence, should read -- a -- ; line 43, "out" should read -- our -- . Column 2, line 42, after "the" the words -- battery charging-- should be inserted, and cancel "a"; line 55, "a" should read -- one --. Column 5, line 75, "sufficient" should read -- sufficiently -- . Column 13, line 20, after "power", insert -- supply -- .

Signed and sealed this 1st day of May 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334